Aug. 27, 1940.   A. F. SPITZGLASS ET AL   2,212,652
INSTRUMENT
Filed Sept. 17, 1934   7 Sheets-Sheet 1

Inventors
Albert F. Spitzglass &
Otto T. Handwerk
by  Jn. W. M Conkey
Attorney

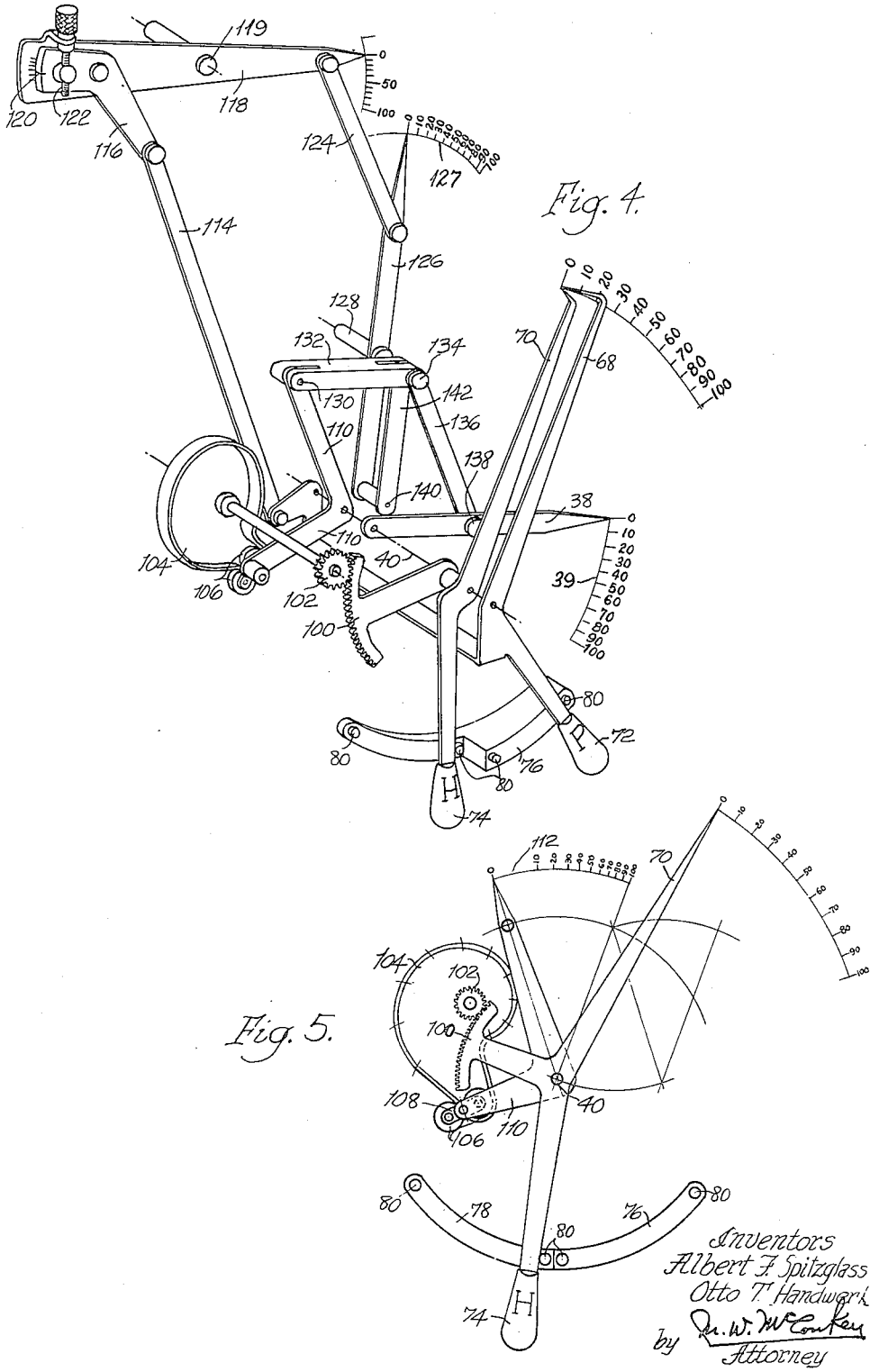

Aug. 27, 1940.   A. F. SPITZGLASS ET AL   2,212,652
INSTRUMENT
Filed Sept. 17, 1934   7 Sheets-Sheet 4
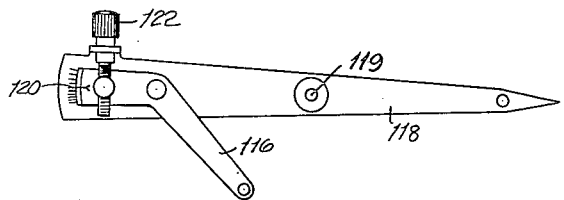
Fig. 7.
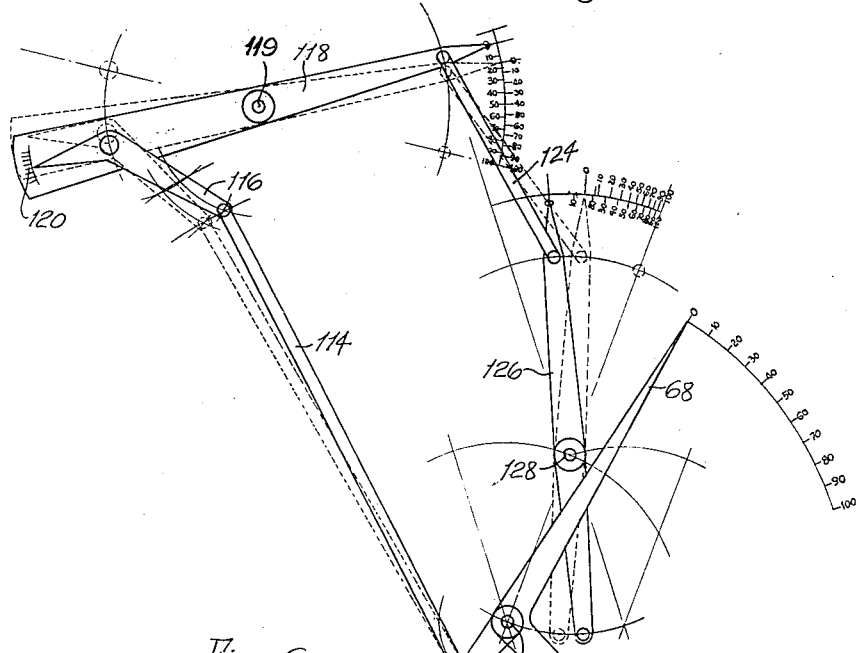
Fig. 6.
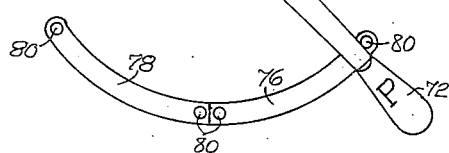
Inventor
Albert F Spitzglass &
Otto T Handwerk
by [signature]
Attorney

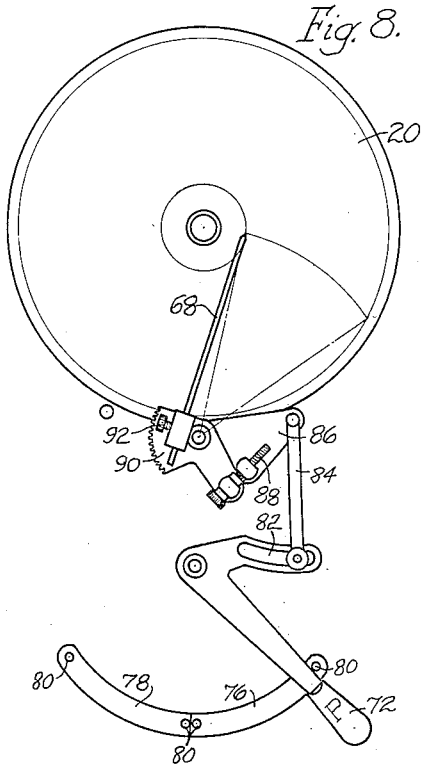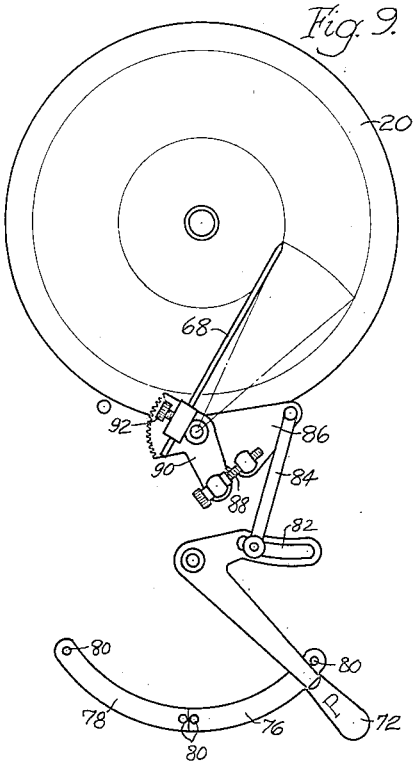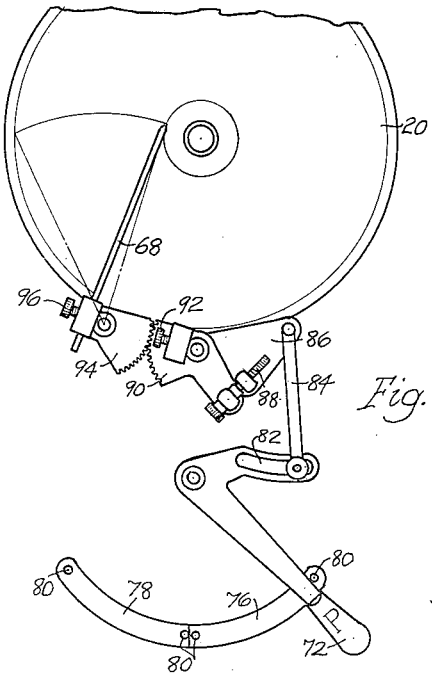

Aug. 27, 1940.  A. F. SPITZGLASS ET AL  2,212,652
INSTRUMENT
Filed Sept. 17, 1934  7 Sheets-Sheet 7

Inventors
Albert F. Spitzglass & Otto T. Handwerk
by
Attorney

Patented Aug. 27, 1940

2,212,652

UNITED STATES PATENT OFFICE 2,212,652

INSTRUMENT

Albert F. Spitzglass and Otto T. Handwerk, Chicago, Ill.

Application September 17, 1934, Serial No. 744,233

3 Claims. (Cl. 235—61)

This invention relates to calculating mechanism, and is illustrated as embodied in an instrument of the planimeter type for integrating a resultant value (such as total flow) from a chart bearing lines or other indications of two component values (e. g., absolute pressure, and the differential in pressure on opposite sides of an orifice, as measured and recorded by a flow meter or the like).

An object of the invention is to utilize in such a mechanism, clear up to the final drive of the integrator indicating mechanism, a novel positive linkage, thereby minimizing errors due to slippage, etc., and giving a more accurate result.

In the illustrated mechanism, levers pivoted at opposite ends are controlled (preferably through square-root devices, in the case of flow calculations) according to the positions of two pointers or the like used to follow the indications on the chart. One of these levers is connected by a linkage to a lever or other means for varying the integrator indicating mechanism drive, and the effect of this linkage in varying the drive is modified by a connection from the other of the levers.

Important features of the invention relate to adjusting the mechanism to calculate charts of different sizes, and for different zero and maximum positions, and to correcting the pressure controlled mechanism to compensate for variations in the atmospheric (i. e. barometric) pressure.

The above and other objects and features of the invention, including various novel combinations of parts and desirable particular constructions, will be apparent from the following description of the illustrative embodiments shown in the accompanying drawings, in which:

Figure 4 is a similar view with the chart-driving mechanism omitted, and with certain levers extended as pointers sweeping over arcuate scales, the latter modification being merely to facilitate the description of the operation of the mechanism;

Figure 5 is a plan view corresponding generally to Figure 4 but showing only the differential-pressure parts;

Figure 6 is a plan view corresponding to Figure 5 but showing only the absolute-pressure parts;

Figure 7 is a view of a modification of one of the levers of Figure 6 and showing a means for correcting for variations in atmospheric (i. e. barometric) pressure;

Figure 11:
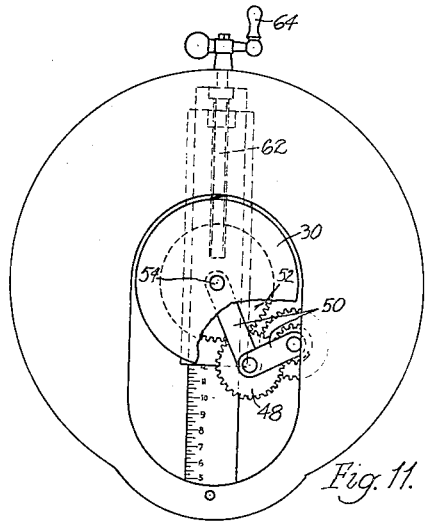
Figure 14:
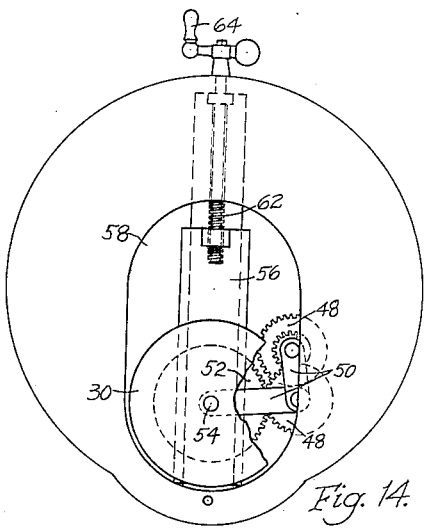
Figure 12:
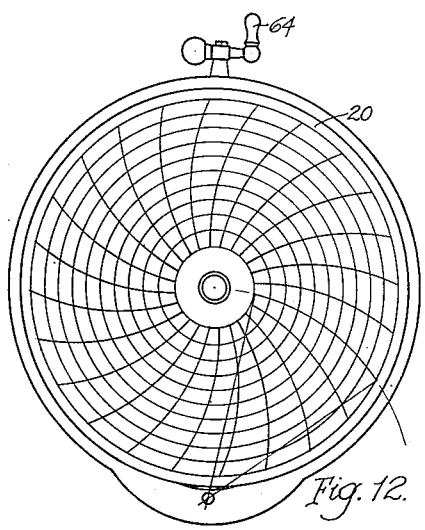
Figure 15:
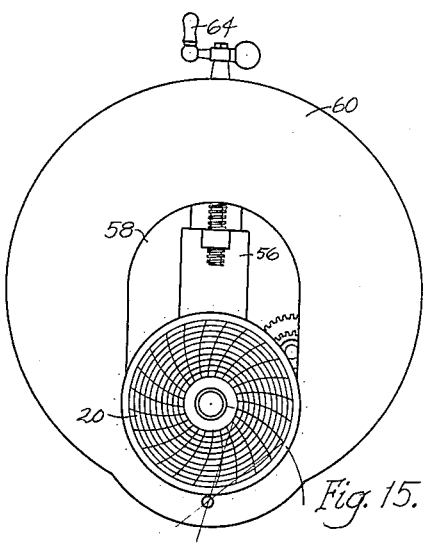
Figure 13:
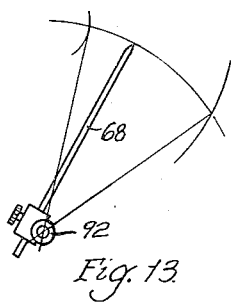
Figure 16:
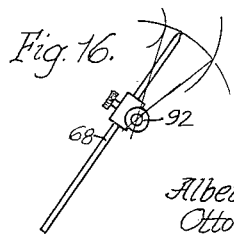
Figure 17:
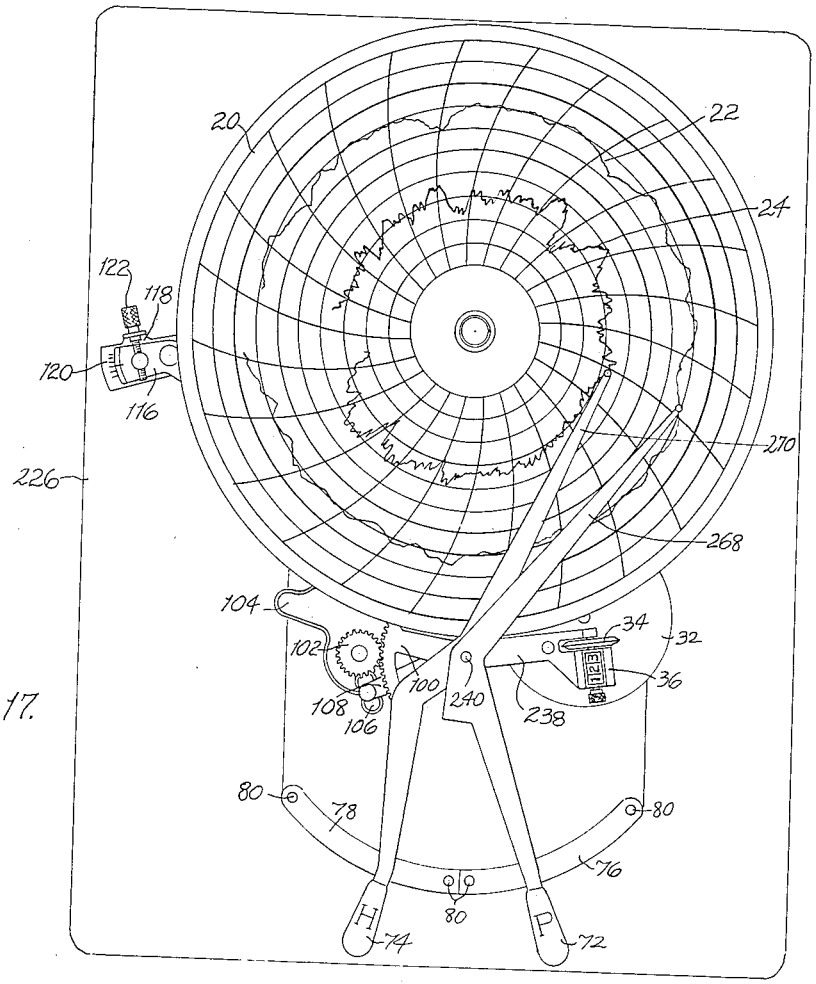
Figure 18:
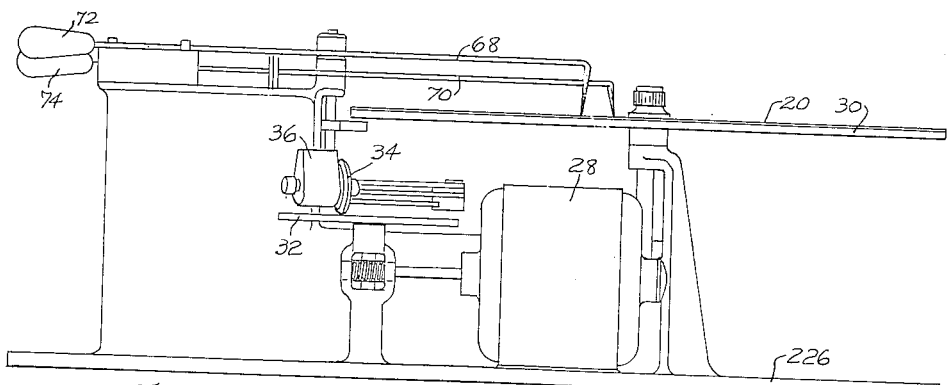

Figures 8, 9, and 10 are plan views, of a diagrammatic character, showing adjustments of the mechanism for different zero and maximum positions, and for left and right pen mountings;

Figures 11, 12, and 13 are diagrammatic plan views of the mechanism set for a 12-inch chart, and showing it respectively with and without the chart in Figures 12 and 11, and showing the indicator setting in Figure 13;

Figures 14, 15, and 16 are corresponding figures for a five-inch chart;

Figure 17 is a top plan view of a different embodiment intended for use only with a single size and design of chart, and therefore without adjustments except for the correction for variations in atmospheric pressure; and Figure 18 is a side elevation of the embodiment of Figure 17, looking from right to left in Figure 17.

The illustrated mechanism is intended for use in integrating the flow of a fluid, for any desired elapsed time, from a chart 20 having inscribed thereon two indication lines 22 and 24. One of these lines indicates the actual pressure (i. e. the pressure above atmospheric pressure) in a conduit, and the other the difference in pressure on opposite sides of an orifice plate in the conduit. These lines are traced on the chart by a record flow meter of any of several well-known designs.

The total flow in the pipe, or the flow for any given time interval, can be calculated by integrating the square root of the differential pressure indicated by the second line multiplied by the square root of the absolute pressure obtained by adding the atmospheric pressure to the pressure indicated by the first line. The present invention relates to apparatus for performing the above or an analogous calculation mechanically, the apparatus being preferably of the planimeter type and having an integrating device controlled jointly by pointers or the like carried by two indicator arms and caused to trace the two lines on the chart.

The illustrated apparatus is shown mounted on a suitable base 26, and includes a motor 28 controlled by a foot-operated rheostat or the like and driving at synchronized speeds a rotatable chart support or table 30 and a rotatable driving disk 32 frictionally engaging the driving wheel 34 of an integrator indicating mechanism or counter 36. The integrator indicating mechanism 36 is shown mounted on a lever 38 pivoted at 40 and moved by the calculating linkage described below, radially across the driving disk 32 to vary the operation to secure the desired integrated result.

The motor 28 is shown driving a shaft 42 formed or provided with two worms 44 and 46, the latter of which drives the integrator-driving disk 32. The worm 44 drives gearing 48, partly carried by swinging links 50 so that the gears at all times remain drivably in mesh while they drive a driven gear 52 connected to the chart-driving support 30, while the support together with the gear 52 are adjusted for different sizes of charts. The chart sizes may if desired be shown on a scale associated with the carriage 56, as shown in Figure 11.

In order to secure this adjustment, the support 30 and the gear 52 are mounted on a shaft 54 carried by a carriage 56 adjusted, lengthwise of an elongated opening 58 in a stationary plate or support 60, by means such as an adjusting screw 62 operated by a suitable handle 64. The stationary support 60 is mounted on the base 26 by means of suitable brackets 66.

Figures 1, 2:
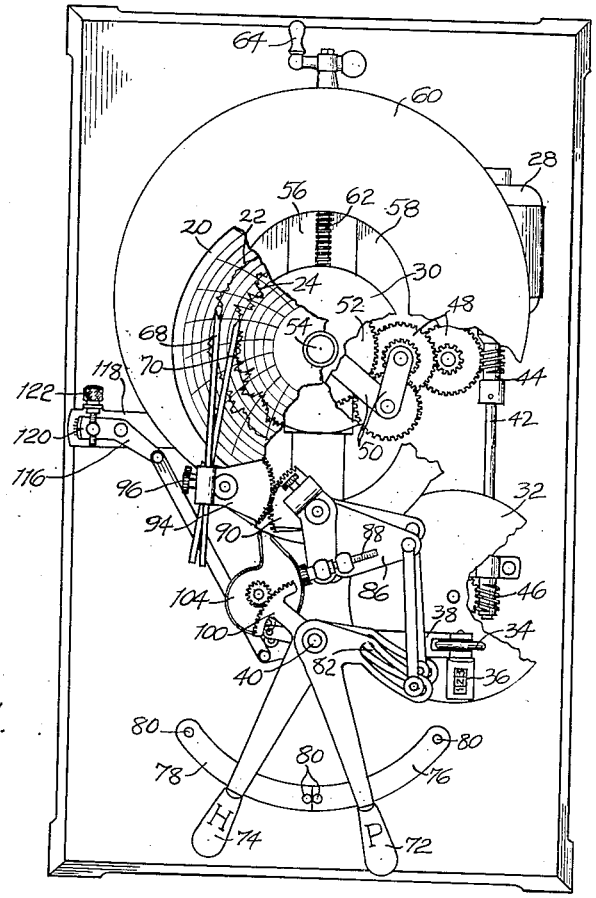
Figure 1 is a top plan view of one preferred form of mechanism.
Figure 2 is a side elevation thereof, looking from left to right in Figure 1.
Figure 3:
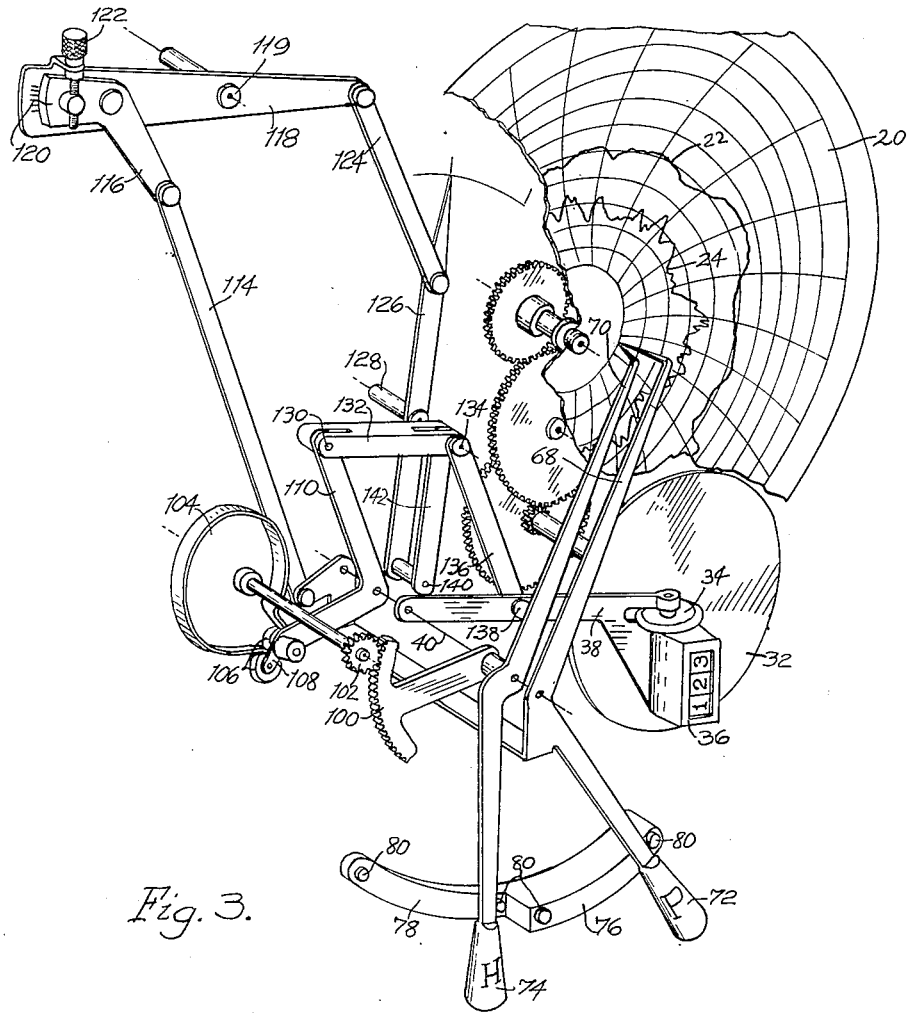
Figure 3 is a partial perspective view of the chart-driving mechanism and the operating linkage and certain associated parts.

The lines 22 and 24 are traced by indicators such as pointers 68 and 70 controlled by operating handles 72 and 74. These handles move with a light frictional contact over sectors 76 and 78 between suitable stops 80, the sectors preferably being arranged at different levels as shown in Figure 3.

In Figures 1, 2, 8, 9, and 10 we illustrate an adjustable connection between the handles and the indicators, to set them for operation on charts having different zero and maximum lines, but have omitted these adjustments in the other figures to simplify the disclosure of the essential parts of the calculating linkage.

As best shown in Figures 8 and 9 to secure the desired adjustments the handle (72 or 74) forms part of a bellcrank lever having an arcuate slot 82 to provide an adjustable connection with one end of a link 84 pivoted at its other end to a lever 86. The lever 86 has a threaded lug adjustably connected by an adjusting screw 88 with a coaxially mounted lever 90 having a socket in which the indicator arm 68 (or 70) is adjustably secured by means such as a set-screw 92.

As shown in Figure 10, lever 90 may be formed at its edge with sector gear teeth, so that when a chart is to be traced on its left side instead of the right, an auxiliary lever 94 having similar teeth meshing therewith may be provided. The lever 94 also has a socket in which the indicator arm 68 may be adjustably clamped by a set-screw 96 or the like.

A comparison of Figures 8, 9, and 10, will show how the zero and maximum adjustments are made. With the handle 72 at the extreme limits of its movement, the adjustments 88 and 82 are so set that the arm just covers the desired angle, whether it is a large angle as in Figure 8 or a smaller angle as in Figure 9, when the handle is moved from one extreme position to the other. By loosening the set-screw 92 or 96, the indicator arm 68 or 70 can be adjusted as to its effective length, for use with a larger chart (Figures 12 and 13) or a small one (Figures 15 and 16).

As the above-described adjustments have nothing to do with the operation of the calculating linkage, they are omitted in Figures 3-7. The differential-pressure linkage is shown diagrammatically in Figure 5, and the static pressure linkage in Figures 6 and 7, with the relationship of the two when assembled shown in Figures 3 and 4, Figure 4 being somewhat more diagrammatic than Figure 3.

When the differential-pressure handle 74 is shifted, to cause its indicator arm 70 to follow its curve on the chart 20, it operates a device such as a rack 100 meshing with a pinion 102 rigid with a square-root cam 104. The cam 104 has an edge flange embraced between two follower-rolls 106 carried by a swinging bar 108 centrally pivoted on one arm of a bell crank lever 110 fulcrumed for movement about the axis 40 about which the levers 72 and 74, and 38 also turn.

As will be apparent from Figure 5, movement of lever 74 is thereby transformed into motion of the upper arm of the bellcrank 110 (as indicated along a scale 112) proportionately to the square root of the differential pressure.

The lever 72 is connected, by means such as a link 114 to a bellcrank adjustment lever 116, shiftable on one end of a lever 118 pivoted at 119 along a correction scale 120 to correct for variations in atmospheric (i. e. barometric) pressure. The scale 120 is graduated in pounds of atmospheric pressure and the pointer 116 may be set thereon according to the barometric reading, the dotted line position in Figure 6 indicating how movement of the lever 116 varies the setting of the lever 126. The bellcrank 116 may frictionally engage the lever 118 as in Figure 6, or it may be held in position by an adjusting screw 122 as in Figures 3, 4, and 7.

Lever 118 is connected by an inclined link 124 to a member 126 mounted on a pivot 128 above the axis 40, the lower end of which may be regarded as a lever fulcrumed at the opposite end from the lever formed by the upper end of the bell-crank 110, these two levers so formed being equal in length from their fulcrums 128 and 40 to the pivots 140 and 130 respectively at their ends.

The angles of levers 118 and 126, and of link 124, are so chosen that movement of lever 118 is transformed into an angular motion of lever 126 proportionate to the square root of the actual pressure plus the atmospheric pressure. The two scales associated with lever 126, and the two associated with lever 118, in Figure 6, show how corrections on the scale 120 for changes in barometric pressure change the entire range of movement of lever 126 proportionately.

In Figure 4, for purposes of description, the lever 118 has been shown terminating in a pointer moving over a scale 119 which is uniformly calibrated in percent from 0 to 100 and the lever 126 has been shown terminating in a similar pointer moving over a scale 127 correspondingly calibrated in percent. These scales and pointers are not ordinarily employed in an actual instrument. It will be noted that the calibrations on the scale 127 are not uniform but follow approximately the square roots of the values. This is due to the fact that the levers 118 and 126 lie at an angle to each other and are connected by the link 124.

With the levers arranged substantially as illustrated, the movement of the lever 126 is substantially proportional to the sine of the angle through which the lever 118 is moved. Since a sine curve and a square root curve substantially correspond throughout a considerable portion of their lengths the movement of the lever 126 is equal to the square root of the movement of lever 118 within very close limits.

We have found that almost any arrangement in which the levers are at an angle will produce a movement following very closely the square root function within a certain range of movement. One very desirable design is illustrated in which the levers 118 and 126 are of the same effective length and the link 124 is slightly longer and the pivots 119 and 128 are so spaced that when the link 124 and lever 126 lie in a straight line they form an angle of 90° with the lever 118. The lengths of the links and levers are, of course, determined by the amount of space available and the amount of movement desired and will be selected for each particular design in view of these factors.

The lever formed by the upper arm of bellcrank 110 is connected by a floating pivot 130 to one end of a floating link 132. The other end of link 132 is connected by a floating joint such as a pivot 134 to the upper end of a second link 136 connected at its lower end by a pivot 138 to the lever 38.

The length of link 132 equals the length of lever 38 from its axis 40 to pivot 138, and the length of link 136 equals the length of lever 110 from axis 40 to pivot 130. Thus parts 110, 132, 136, and 38 form a parallelogram linkage.

The lever formed by the part of member 126 extending below its fulcrum or pivot 128 is equal in length to link 136, and is connected at its lower end by a pivot 140 to a link 142 which is pivoted at its upper end to the floating joint 134. When both the levers 126 and 38 are in zero positions, pivots 138 and 140 are coaxial, parts 136, 142, and 126 are superposed, and pivots 134 and 128 are coaxial. This does not happen in use, however, as lever 126 never reaches such a zero position, its minimum position being that corresponding to atmospheric pressure (i. e. fourteen and a fraction pounds).

When levers 110 and 126 are in their maximum or 100% positions, lever 38 is also at its maximum position, and pivots 128 and 130 are coaxial.

The parts are shown in Figure 4 with levers 110 and 38 in their zero positions. For purposes of description the lever 38 has been shown moving over a scale 39 calibrated in percent from 0 to 100 but it will be understood that this scale is not used in practice, the lever 38 carrying the indicating mechanism 36.

With the parts of the linkage proportioned and arranged as described above, the motion of lever 38 is in proportion to the product of the movements of levers 110 and 126, and is therefore in proportion to the product of the square roots of the differential pressure and of the sum of the measured actual pressure plus the atmospheric pressure. As the operation of device 36 is in proportion to the motion of lever 38, it will therefore integrate the product of the two square roots as the pointers 68 and 70 trace the two lines on the chart.

The operation of the multiplying linkage, and its theory of operation, are more fully set forth in our Patent No. 2,045,621 issued June 30, 1936.

Figures 17 and 18 show a simplified form of apparatus suitable for use with a single standard form and size of chart, reference characters for parts corresponding to those described above, where somewhat changed in form or arrangement, being increased by 200. The operation is the same as described, except that no means is provided to adjust for different sizes or arrangements of charts.

While two illustrative embodiments have been described in detail, it is not our intention to limit the scope of the invention to those particular embodiments, or otherwise than by the terms of the appended claims.

We claim:

1. A chart calculating mechanism comprising a base having an elongated opening and having a pivoted indicator member mounted adjacent one end of the opening, a carriage adjustably movable lengthwise of said opening and having a support for a chart associated with said member, means for driving said support and a tracer member carried by said indicator member and adjustable to pass through the center of the chart in any of its adjusted positions.

2. A chart calculating mechanism comprising a pivoted indicator member, a carriage adjustably movable relatively to said member and having a support for a chart associated with said member, means for driving said support and a tracer member carried by said indicator member and adjustable to pass through the center of the chart in any of its adjusted positions.

3. Chart calculating mechanism comprising means for supporting and driving a chart, devices for following lines on said driven chart indicating a differential pressure and a pressure related to atmospheric pressure, mechanism controlled by said devices and integrating automatically as said lines are followed a joint function of the differential pressure and a pressure derived from said second pressure by adding the atmospheric pressure thereto, and means for adjusting said mechanism to correct for variations in atmospheric pressure.

ALBERT F. SPITZGLASS.
OTTO T. HANDWERK.